United States Patent [19]

Marcatili

[11] 4,157,860
[45] Jun. 12, 1979

[54] DUAL POLARIZATION ELECTROMAGNETIC SWITCH AND MODULATOR

[75] Inventor: Enrique A. J. Marcatili, Rumson, N.J.

[73] Assignee: Bell Telephone Laboratories, Incorporated, Murray Hill, N.J.

[21] Appl. No.: 840,594

[22] Filed: Oct. 11, 1977

[51] Int. Cl.² .............................................. G02B 5/14
[52] U.S. Cl. ............................ 350/96.14; 350/96.13; 350/150; 350/355
[58] Field of Search ................... 350/96.13, 96.14, 150, 350/355, 96.15

[56] References Cited

U.S. PATENT DOCUMENTS

| | | | |
|---|---|---|---|
| 3,874,782 | 4/1975 | Schmidt | 350/96.13 |
| 4,012,113 | 3/1977 | Kogelnik et al. | 350/96.13 |
| 4,035,058 | 7/1977 | Papuchon | 350/96.14 |
| 4,054,362 | 10/1977 | Baues | 350/96.14 |

OTHER PUBLICATIONS

Kaminow et al., "Electrooptic Light Modulators," *Proc. of the IEEE*, vol. 4, No. 10, Oct. 1966, p. 1375ff.
Steinberg et al., "Polarization-Insensitive Integrated-Optical Switches . . . ", *Applied Optics*, vol. 16, No. 8, Aug. 1977, pp. 2166–2170.
Steinberg et al., "Performance Limitations Imposed on Optical . . . ", *Applied Optics*, vol. 15, No. 10, Oct. 1976, pp. 2440–2453.

*Primary Examiner*—John K. Corbin
*Assistant Examiner*—John D. Lee
*Attorney, Agent, or Firm*—Sylvan Sherman

[57] ABSTRACT

Integrated optics directional coupler modulator/switches are improved by the disclosed configurations for switching optical modes of both polarizations at once. In one configuration a pair of parallel optical waveguides are provided having material presenting first and second wavenumbers $\beta$ for the TE and TM modes. Two independently tunable control signals are applied to an electrode assembly arranged so that each wavenumber is substantially tunable relative to the other thereby permitting substantially complete switching of both of the modes. In an exemplary embodiment, the material is lithium niobate or lithium tantalate with its c-axis perpendicular to the waveguides and oriented between 15 and 75 degrees, suitably at 45 degrees, to the substrate plane. Pairs and triplets of electrodes are used as appropriate to provide vertical and horizontal electric field components so as to independently tune the waveguide wavenumbers and coupling. The principles are applicable to electromagnetic apparatus in general and a variety of physical fields are alternatively used as appropriate for achieving the dual polarization control.

11 Claims, 9 Drawing Figures

FIG. 1
PRIOR ART

$L = n\ell, \; n = 1, 3, 5, \cdots$

FIG. 2
OPTICAL POLARIZATION MODES

$\Delta\beta_{TM} \propto r_{33} E_z$
$\Delta\beta_{TE} \propto r_{13} E_z$

FIG. 3

DUAL POLARIZATION ELECTROMAGNETIC SWITCH AND MODULATOR

BACKGROUND OF THE INVENTION

The present invention relates to the field of modulators and switches for electromagnetic energy propagating in waveguides. More specifically, the present invention relates to modulators and switches for electromagnetic energy of arbitrary polarization propagating in such waveguides.

The present work relates to a wide variety of apparatus operating at many electromagnetic wavelengths. For brevity, the background of the invention is discussed in connection with the field of integrated optics. The use of electromagnetic waves for carrying communications and other signals in modulated form is well known. In recent years, ever more attention has been focused on the potential of carrying advantageously large amounts of information in modulated form on light waves having optical wavelengths in the infrared, visible, and ultraviolet regions of the electromagnetic spectrum. In order to route information from each of many sources to each of many destinations, means of impressing or modulating the information on the light as well as means of switching the light to the appropriate distination are required. It has been proposed that chiplike substrates of crystalline material be provided with waveguides and electrodes for accomplishing such functions.

In one form of integrated optics switch and modulator, a pair of waveguides or refractive index greater than the surrounding substrate are provided in close parallel relationship to one another with electrodes provided thereon. Unfortunately, in many substances such as lithium niobate ($LiNbO_3$) and lithium tantalate ($LiTaO_3$) the modulators and switches so formed have proven to be polarization sensitive. For example, when light having a direction of polarization perpendicular to the substrate plane can be substantially modulated or switched, light with a polarization parallel to the substrate plane is simultaneously disadvantageously unaffected or relatively unaffected.

Accordingly, it is an object of the present invention to extend the capabilities of directional coupler electromagnetic modulator/switches so as to be able to modulate and switch electromagnetic radiation regardless of its polarization makeup.

Also, it is an object of the present invention to provided integrated optics modulators and switches which are able to operate on light of arbitrary polarization.

In addition, it is an object of the present invention to permit considerably relaxed fabricational tolerances in the manufacture of miniature electromagnetic, including optical, modulators and switches by permitting electrical tuning adjustments so that the switching of both polarizations of electromagnetic energy is substantially complete.

It is a further object of the invention to provide electromagnetic modulators and switches having waveguides formed in crystalline material such as $LiNbO_3$ and $LiTaO_3$ in which the electrooptic sensitivity of the substance is not substantially degraded by comparison with prior art modulators.

It is still further object of the present invention to provide integrated optics modulators and switches in crystalline waveguides such as $LiNbO_3$ and $LiTaO_3$ in which the electrooptic sensitivity of the substance is substantially equal in magnitude to its $r_{33}$ coefficient for not one, but both polarization modes.

It is even a further object of the invention to provide electromagnetic modulators and switches in which this dual polarization advantage is provided by a structure utilizing sequential positive and negative wavenumber changes for substantially increased bandwith and/or decreased crosstalk and thus, essentially complete switching.

SUMMARY OF THE INVENTION

These and other objects are accomplished by means of an invention of dual-polarization, wave-processing waveguide type some illustrative embodiments of which are herein disclosed in the form of directional couplers. A pair of parallel waveguides are, for example, provided in sufficient proximity so as to act as one type of directional coupler for propagating electromagnetic energy having a fundamental mode of first and second distinct polarizations. The waveguides are made of a material or materials through which the electromagnetic energy passes. The transverse magnetic (TM) polarization mode sees a wavenumber $\beta_{TM}$ in each guide (suitably designated $\beta_{1TM}$ and $\beta_{2TM}$ respectively), and the transverse electric (TE) polarization mode correspondingly sees a wavenumber $\beta_{TE}$ in each guide (suitably designated $\beta_{1TE}$ and $\beta_{2TE}$, respectively). The nature of the material or materials is such that a physical field such as a magnetic, acoustic or electric field having tunable horizontal and vertical components can be impressed on one or both of the waveguides so that equal changes or mismatches in the wavenumbers $\Delta\beta_{TM}=\beta_{1TM}-\beta_{2TM}$ and $\Delta\beta_{TE}=\beta_{1TE}-\beta_{2TE}$ or other changes in said wavenumbers as between the waveguides are produced. By virtue of the tunability of $\Delta\beta_{TE}$ and $\Delta\beta_{TM}$, or equivalently $\beta_{TE}$ and $\beta_{TM}$, both polarization modes are able to be modulated or switched simultaneously or in tandem in the directional coupler or other waveguiding, wave-processing device in the invention. First and second electrical sources of independently tunable control signals are connected to electrodes mounted on or near the waveguides so as to provide tuning of the perpendicular electric field components when an electric field is to be employed. Equivalently, it may be said that the electrode means are such as to permit tuning of the impressed electric or other vector field not only in magnitude, but also in field direction in the waveguides. The construction of the modulator/switch is such that each wavenumber $\beta$ or wavenumber mismatch $\Delta\beta$ and the coupling constants between waveguides are made tunable in magnitude and tunable relative to the other in response to a change in one of the control signals corresponding thereto.

In an advantageous specific aspect of the invention, perovskite uniaxial electrooptic crystals such as $LiNbO_3$ and $LiTaO_3$ are provided as substrates having the waveguides formed in or on each substrate with a c-axis oriented perpendicular to the parallel waveguides and at an angle between 15 and 75 degrees and suitably 45 degrees to the substrate plane. It is recognized that the electrooptic effect due to the $r_{33}$ coefficient in response to a first electric field component is supplemented by an effect due to the large $r_{42}$ coefficient which is responsive to a second perpendicular electric field component. The two aspects of the electrooptic effect due to the $r_{33}$ and $r_{42}$ coefficients cooperate to permit tuning of not one but both of the polarization mode wavenumbers $\beta$ as well as coupling for both polarization modes. The modulator or switch of the invention operates remarkably as a synergistic combination to yield distinct improvements in comparison with the prior art.

DETAILED DESCRIPTION

Figure 1:
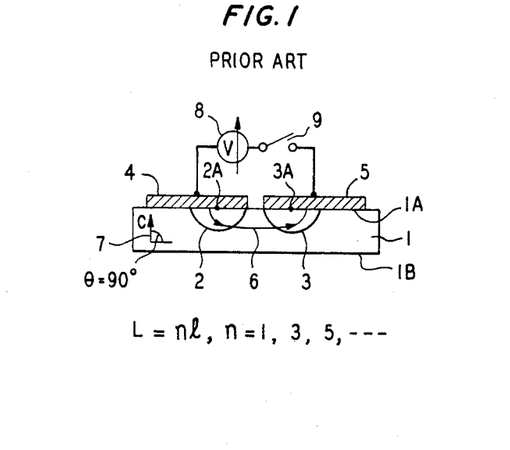
FIG. 1 represents a cross-section of a prior art modulator or switch for integrated optics.

In FIG. 1, a typical prior art integrated optics electrooptic modulator and switch is suggested. A lithium niobate substrate 1 has indiffused titanium single mode waveguides 2 and 3 for carrying light, there being mutually parallel portions of the waveguides in sufficient proximity, on the order of microns, for directional coupling therebetween. The c-axis 7 of the substrate 1 is such as to be perpendicular to both of the waveguide axes 2A and 3A and to the major surface 1A of substrate 1. This orientation of the c-axis 7 is described by the angle $\Theta = 90$ degrees between the c-axis and a line perpendicular to the waveguide axes and parallel to the substrate major surfaces 1A and 1B. Electrodes 4 and 5 are respectively located on or over the waveguides 2 and 3. The length (into the paper) of the waveguides where they are most nearly proximate is photolithographically defined and fabricated to be a length L equal to or an odd multiple of a minimum resonant cross-over length l. An adjustable voltage source 8 for providing a voltage V is connected between electrodes 4 and 5 via switch 9.

This prior art integrated optics modulator/switch operates such that when switch 9 is off, light entering waveguide 2 is coupled into and remains in waveguide 3. However, when switch 9 is closed and an electric field 6 is impressed upon the waveguides 2 and 3, the component of the electric field in each of the waveguides which is parallel to c-axis 7 has an influence on the refractive index presented to polarized light, which disrupts the directional coupler action and causes the light to propagate down waveguide 2 without being switched into the waveguide 3.

Figure 2:
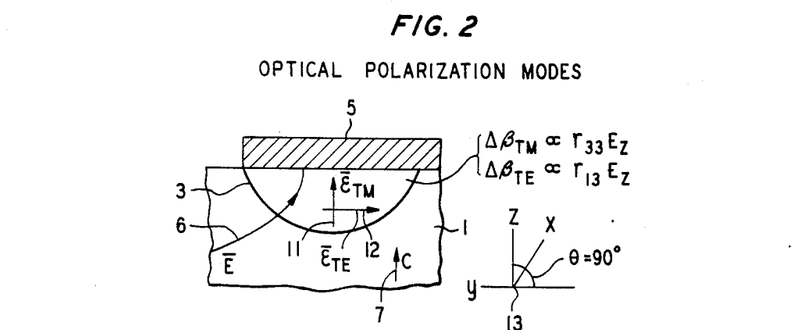
FIG. 2 represents a magnified portion of the cross-section of FIG. 1.

In FIG. 2 an area of the cross-section of the prior art integrated optics device of FIG. 1 is magnified so as to facilitate discussion of the operation thereof thereby permitting some analysis leading to a fuller understanding of the invention. Electric field 6 represented by the vector $\overline{E}$ is shown as a curved line, although it should be understood that the electric field is found all across the cross-section of waveguide 3 oriented in the same general direction as curved line 6. Light traveling in a diffused waveguide such as waveguide 3 propagates in the x direction of coordinate system 13 in optical modes which qualitatively correspond in polarization with the directions of arrows 11 and 12. The actual traveling light is an electromagnetic field of potentially arbitrary direction of the electric field vector $\overline{\epsilon}$, but fortunately it may be considered to be the vector sum of the electric field vectors of two fundamental polarization modes designated transverse electric (TE) and transverse magnetic (TM).

The electric vectors 12 and 11 of the TE and TM modes respectively are illustrated in FIG. 2 and designated $\overline{\epsilon}_{TE}$ and $\overline{\epsilon}_{TM}$. The TM mode has an electric field vector which is parallel to the c-axis 7 in FIG. 2. Accordingly, it sees a wavenumber $\beta_{TM}$ which is proportional to the extraordinary refractive index $n_e$ of LiNbO$_3$. The change in $\beta_{TM}$ due to a voltage applied to electrode 5 is proportional to $r_{33}E_z$ where $E_z$ is the component of the impressed electric field $\overline{E}$ in the z direction as indicated by coordinate system 13. Correspondingly the TE mode vector sees a wavenumber $\beta_{TE}$ corresponding to the ordinary index $n_o$ of the LiNbO$_3$. The change in the wavenumber $\beta_{TE}$ (and the ordinary index $n_o$) in proportional to $r_{13}E_z$. Unfortunately, in many substances of interest such as LiNbO$_3$ and LiTaO$_3$, $r_{33}$ and $r_{13}$ are quite different in magnitude so that it is impractical to make a directional coupler switch which acts on both polarization modes in the same way. Also, both modes in this prior art switch are affected by the electric field component $E_z$, thereby providing only one degree of freedom for tuning adjustments.

The present disclosure shows how such limitations may be overcome.

Figure 3:
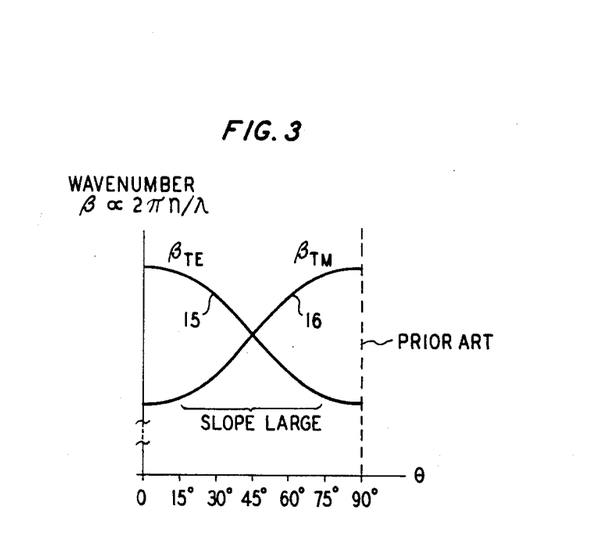
FIG. 3 is a graph of the two wavenumbers $\beta$ versus the substrate c-axis orientation angle $\Theta$.

In FIG. 3, the wavenumbers $\beta_{TE}$ and $\beta_{TM}$ are qualitatively plotted versus the c-axis orientation angle $\Theta$. $\Theta$ has a range between 0 and 90 degrees, and all other 73 angles are equivalent to some angle in this range. When $\Theta = 90$ degrees, the wavenumber $\beta_{TM}$ for the TM mode, which has its electric vector $\overline{\epsilon}_{TM}$ in the c-axis direction, is higher than $\beta_{TE}$ because the extraordinary index $n_e$ exceeds the ordinary index $n_o$ in the LiNbO$_3$. On the other hand, at $\Theta = 0$ degrees (not shown in FIG. 1), the c-axis is parallel to the substrate surface and the wavenumbers presented to the TE and TM modes are interchanged. It is therefore to be expected from phenomenological considerations that at intermediate values of $\Theta$ the wavenumbers presented to the modes vary between their extreme values at $\Theta = 0$ and 90 degrees as shown by curves 15 and 16. In the range 15 to 75 degrees, the slopes of the wavenumber curves are nonnegligible, and therefore an effect which can utilize a distinct electric field component to influence the angle $\Theta$ can provide an extra degree of freedom for solving the dual polarization problem.

Of course, while LiNbO$_3$ and LiTaO$_3$ in the c-axis orientation range 15 to 75 degrees are being discussed, by way of example, the invention contemplates that the waveguide material used simply be such that some physical field, whether it be electrical, as shown, or magnetic, acoustic or otherwise, can be applied with 2 degrees of freedom for adjusting the wavenumber changes $\Delta\beta_{TM}$ and $\Delta\beta_{TE}$ so the dual polarization switching can be obtained. Thus, the invention in its broadest scope is not believed to be limited by way of c-axis orientation, material, or the specific type of field used.

Figure 4:
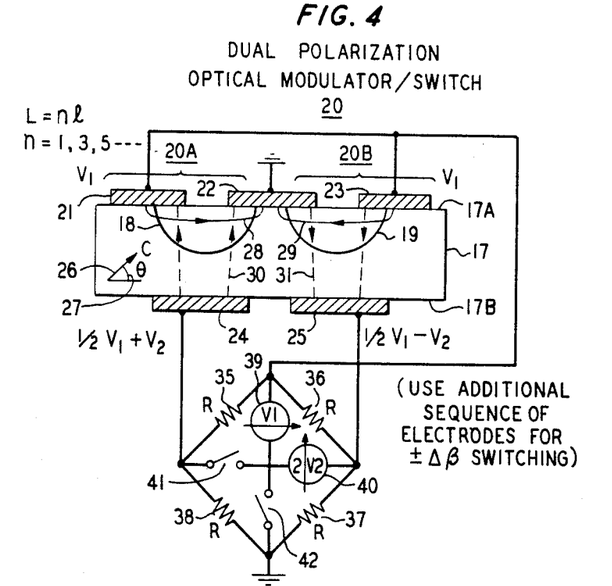
FIG. 4 is a partially cross-sectional view and partially schematic representation of a dual polarization optical modulator and switch according to the invention with an electrical circuit for providing control signals.

In FIG. 4, a specific embodiment of the invention based on the foregoing principles is disclosed. Dual polarization optical modulator/switch 20 employs substrate 17 with indiffused titanium waveguides 18 and 19. The substrate and waveguide c-axis 26 is oriented perpendicular to waveguides 18 and 19 and at an angle 27 to substrate surface 17A, the angle being designated by $\Theta$, which illustratively is taken to be 45 degrees. Electrodes 21, 22 and 23 have portions deposited on the upper major surface 1A of substrate 17 so that electrodes 21 and 22 are laterally adjacent to waveguide 18 and electrodes 22 and 23 are laterally adjacent to waveguide 19. Electrodes 21 and 23 are located on either side of waveguides 18 and 19 and are at approximately equal electrical potentials with respect to middle electrode stripe 22, which is located between waveguides 18 and 19 and is illustratively grounded. The upper triplet of electrodes 21–23 provides oppositely directed horizontal electric field components 28 and 29 which act to affect the wavenumber changes for the TE mode only. Field components 28 and 29 are approximately perpendicular to the lengths of waveguides 18 and 19 and approximately parallel to the plane of the waveguides 17A. Electrodes 24 and 25 are deposited with portions on a bottom major surface 17B opposite surface 17A of substrate 17 so as to lie over waveguides 18 and 19 respectively when viewed from bottom surface 17B and lie beneath the waveguides when viewed from top surface 17A. Electrodes 24 and 25 are brought close to the electrodes 21, 22, and 23 either by mechanically machining, ion machining, or etching the substrate 17 so as to obtain reasonably high fields with low voltages on the electrodes. Electrodes 24 and 25 are provided with voltages having an average equal to one-half of the potential difference between electrode 21 or 23 and electrode 22. If the electrodes 21 and 23 are at ground potential, meaning that there are no transverse electric field components 28 or 29, then the voltages applied to electrodes 24 and 25 have an average of 0 and consequently are equal and opposite in sign. Accordingly, vertical electric field components 30 and 31 having opposite direction in waveguides 18 and 19 are also produced. Field components 30 and 31 are approximately perpendicular to waveguides 18 and 19 and to the plane 17A including the waveguides. The application of voltages as hereinbelow described to all of the electrodes 21–25 results in practically any desired combination of independently tunable vertical and horizontal field components $E_y$ and $E_z$ being induced in the waveguides. The two waveguides 18 and 19 with electrodes 21, 22, 24 and 22, 23, 25, respectively are suitably considered as forming a switch 20 composed of not one but two wave-processing waveguide devices 20A and 20B according to the invention. A circuit for providing the electrode voltages, while believed apparent to one skilled in the art in light of the voltage requirements just stated, is shown in FIG. 4 as a schematic diagram.

The voltage providing circuit has two independently tunable control voltage sources 39 and 40. Source 39 provides a voltage $V_1$ which adjusts the horizontal or TE mode wave number changes. Voltage source 40 provides a voltage $2V_2$ which adjusts the vertical or TM wavenumber changes. Sources 39 and 40 are connected and disconnected by switches 41 and 42 so as to provide modulating or switching signals to which the electrodes 21-25 are responsive. The desired electrode voltage relationships are satisfied by employing a bridge circuit including equal resistances 35, 36, 37, and 38 as shown in FIG. 4.

For instance, if switch 41 is open and switch 42 is closed so that outer stripes 21 and 23 are provided with voltage $V_1$ relative to middle stripe 22, then the electrode pair of stripes 24 and 25 beneath waveguides 18 and 19 bear equal voltages equal to one-half $V_1$.

If switch 42 is open and switch 41 is closed, electrode outer stripes 21 and 23 are at ground potential due to the voltage divider action of resistors 35 and 36 and electrode stripes 24 and 25 are equal and opposite in voltage and bear voltages $V_2$ and $-V_2$ respectively. When both switches 41 and 42 are closed, the circuit produces voltages on stripes 24 and 25, equal to half of $V_1$ plus and minus $V_2$ respectively, according to the superposition principal of electrical network theory. As a consequence, substantially any combination of electric field components in the waveguides may be produced by the independent adjustment of voltages $V_1$ and $2V_2$ by sources 39 and 40.

It should be understood that the circuit of FIG. 4 is purely illustrative. One aspect of the practical operation of the invention contemplates dual polarization switching by simultaneous actuation of switches 41 and 42 at high rates or speed. Accordingly, well known switching transistor circuits or other high speed switching means are also advantageously employed as substitutes for mechanical switches in the control circuit of the invention. Likewise, the tuning of the voltage sources $V_1$ and $2V_2$, which may be manual in a laboratory context, is, in commercial operation, preferably of automatic or preset nature. Either way, the invention advantageously eliminates the need for excessively stringent tolerances in cutting the substrate or locating the waveguides and electrodes since adjustments of electrical type compensate for mechanical departures from a given design geometry.

Figure 5:
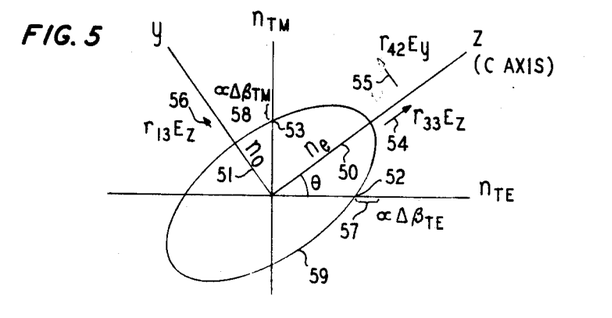
FIG. 5 is a diagram of a phenomenological refractive index ellipsoid cross-section useful in explaining the cooperation of the $r_{33}$ and $r_{42}$ coefficients utilized in certain embodiments of the invention.

As previously pointed out, the material used in the waveguides 18 and 19 must be of a type suitable for the invention. FIG. 5 is provided for explaining why $LiNbO_3$ and $LiTaO_3$ with an inclined c-axis are two specific examples of such material. FIG. 5 shows what is presently called a phenomenological refractive index ellipsoid 59. It is well-known that uniaxial crystals exhibit birefringence. This means that, in general, plane wave radiation in such material has one polarization component which "sees" a refractive index called the extraordinary index $n_e$ and travels at a different speed than the perpendicularly polarized component of the radiation which "sees" a refractive index $n_o$. The c-axis is by definition that direction of polarization of light which "sees" the extraordinary index.

In a classical analysis, an index ellipsoid is drawn for the material and a section of the ellipsoid normal to the direction of plane wave propagation can have its semimajor axis proportional in length to $n_e$ and its semiminor axis proportional to $n_o$. From the standpoint of plane wave propagation in birefringent material of infinite extent, only the semimajor and semiminor axes have physical meaning. However, in a preferred embodiment of the invention, the waveguides carry only a single TM mode and a single TE mode. Considerable reflection from a ray-optic point of view in the waveguide occurs which leads to wavenumber values $\beta_{TE}$ and $\beta_{TM}$, according to FIG. 3. These wavenumber values can be intermediate those which would be expected from the purely plane wave analysis in an infinite uniaxial medium.

Accordingly, the whole of the index ellipsoid cross-section 59 takes on a physical meaning in view of the phenomenological consideration of electromagnetic wave reflection. FIG. 5 shows the phenomenological ellipsoid cross-section 59 oriented with its semimajor axis 50 in the z direction, or c-axis direction, and its semiminor axis 51 oriented in the y direction. The ordinate $n_{TM}$ and the abscissa $n_{TE}$ intersect the ellipsoid cross-section at the effective values 53 and 52 of refractive index corresponding to the wavenumbers seen by the TM and TE modes respectively. The z-axis and c-axis are oriented at the angle $\Theta$.

From the standpoint of parallel waveguide directional coupler modulator and switch applications, it is the changes in the wavenumbers corresponding to the changes in the refractive indices $n_{TM}$ and $n_{TE}$ that are primarily of interest. This is because the parallel waveguides 18 and 19 are fabricated substantially identical from the standpoint of a TE mode in each waveguide or a TM mode in each waveguide, and the induced index changes serve to perform a spoiling effect in the device.

Referring again to FIG. 5, application of an electric field $E_z$ along the z direction produces a change in the extraordinary index $n_e$ and length of semimajor axis 50 which is proportional to $r_{33}E_z$ as represented by arrow 54. The same field $E_z$ produces a considerably smaller change in the ordinary index $n_o$ proportional to $r_{13}E_z$ as represented by the much smaller arrow 56. $r_{33}$ is the strongest electrooptic coefficient in $LiNbO_3$ and $LiTaO_3$. $r_{13}$ is about one-fourth as large and will be deemphasized in the qualitative discussion which follows.

An electric field in the $E_y$ direction serves to either increase or decrease the orientation angle $\Theta$ of the ellipsoid relative to the directions of polarization, the direction of angle change depending on the direction of $E_y$. The amount of change in angle is proportional to $r_{42}E_y$ as shown by arrow 55. Arrows 54 and 55 are of comparable length because the $r_{33}$ and $r_{42}$ coefficients are of comparable magnitude in $LiNbO_3$ and $LiTaO_3$.

If an electric field $E_M$ corresponding to field component 30 of FIG. 4 be applied vertically to the waveguide, components of the $E_M$ field lie in both the y and z directions of FIG. 5, as when $\Theta$ is 45 degrees for example. Then, the change 58 in refractive index, which is proportional to $\Delta\beta_{TM}$ as seen by the TM mode is positive due to the increase in size of the ellipse because of $E_z$ and also because of the rotation of the ellipse counter-clockwise causing point 53 to rise on the $n_{TM}$ axis. On the other hand, the two effects operate at cross-purposes from the standpoint of the wavenumber seen by the TE mode when only a vertical electric field component $E_M$ is considered. The tendency for point 52 to move to the right on the $n_{TE}$ axis as the ellipse increases in size due to $r_{13}E_z$ and $r_{33}E_z$ is off-set by the tendency of point 52 to move to the left because of the counter-clockwise rotation of the ellipsoid due to $r_{42}E_y$. This means that when the ratio of $E_y$ and $E_z$ is properly chosen, the TM modes can be effected without any corresponding effect on the TE modes.

On the other hand, if an electric field $E_E$ corresponding to field component 28 of FIG. 4 be applied to the right in FIG. 5, then the ellipse is enlarged in size due to a component of the electric field in the z direction. However, the rotation of the ellipse is now clockwise instead of counter-clockwise because the electric field has a component anti-parallel to the y direction. These two effects add vectorially, to yield a large effect on the TE modes by producing a relatively large change 57 in the effective index 52 in the wavenumber $\beta_{TE}$ seen by the TE modes. In the case of the horizontal electric field $E_E$, the tendency at point 53, however, is towards a cancellation in the wavenumber change $\Delta\beta_{TM}$ since an index increase at point 53 due to $r_{13}E_z$ and $r_{33}E_z$ is off-set by the clockwise rotation $r_{42}E_y$ of the ellipsoid cross-section.

It is readily seen then, that the vertical and horizontal electric fields $E_M$ and $E_E$ are capable of controlling the wavenumber changes $\Delta\beta_{TM}$ and $\Delta\beta_{TE}$ presented to the TE and TM modes in a substantially independent manner. Since, as shown in FIG. 4, voltage sources $V_2$ and $V_1$ are capable of independently controlling the vertical and horizontal electric field components respectively, these voltage sources are able to independently control the wavenumber changes $\Delta\beta_{TM}$ and $\Delta\beta_{TE}$, respectively. The large electrooptic coefficients $r_{33}$ and $r_{42}$ are used in both cases yielding a remarkably sensitive dual polarization optical switch.

Some mathematical calculations are now presented in order to even more specifically describe one advantageous crystal cut for use in the embodiments of the invention. When an electric field is applied to a crystal the general equation of the index ellipsoid can be written as set forth in "Electrooptic Light Modulators" by I. P. Kaminow et al., *Proceedings of the IEEE*, Vol. 54, No. 10, October 1966, pp. 1375, equation 3. The ellipsoid cross-section of FIG. 5 herein is derived from the general equation and is found to be given by $$(1/n_o^2 - r_{12}E_y + r_{13}E_z)y^2 + (1/n_e^2 + r_{33}E_z)z^2 + 2r_{42}E_y yz = 1. \tag{1}$$

In order to find the effective refractive indices $n_{TM}$ and $n_{TE}$ represented by points 53 and 52, respectively, it is necessary to solve Equation 1 first for $n_{TM}$ and then for $n_{TE}$ by using the following equations relating $n_{TM}$ and $n_{TE}$ to their coordinates in the y, z system based on the assumption that $\Theta$ is 45 degrees. When $\Theta$ is 45 degrees, the coordinates of $m_{TM}$ (point 53 in FIG. 5) are $y = n_{TM}/\sqrt{2}$ and $z = n_{TM}/\sqrt{2}$ and the coordinates of $n_{TE}$ (point 52) are $y = n_{TE}/\sqrt{2}$ and $z = n_{TE}/\sqrt{2}$. Accordingly, $$y^2 = z^2 = n_{TM}^2/2 = n_{TE}^2/2 \tag{2}$$

Also, in Equation 1 when solving for $n_{TM}$ set $$yz = n_{TM}^2/2. \tag{3}$$

Also, in Equation 1 when solving for $n_{TE}$ set $$yz = -n_{TE}^2/2. \tag{4}$$

In order to obtain expressions in terms of the vertical and horizontal fields $E_M$ and $E_E$ set $$E_z = (E_M + E_E)/\sqrt{2}, \text{ and} \tag{5}$$

$$E_y = (E_M - E_E)/\sqrt{2}. \tag{6}$$

Substituting equations (2) through (6) into Equation (1), and solving yields $$n_{TM} = \sqrt{\frac{2n_o^2 n_e^2}{n_o^2 + n_e^2}} \left\{ 1 + \frac{1}{2\sqrt{2}} \frac{(r_{12} - 2r_{42} - (r_{13} + r_{33}))E_M - (r_{12} - 2r_{42} + r_{13} + r_{33})E_E}{\frac{1}{n_o^2} + \frac{1}{n_e^2}} \right\} \quad (7)$$

$$n_{TE} = \sqrt{\frac{2n_o^2 n_e^2}{n_o^2 + n_e^2}} \left\{ 1 + \frac{1}{2\sqrt{2}} \frac{(r_{12} + 2r_{42} - (r_{13} + r_{33}))E_M - (r_{12} + 2r_{42} + r_{13} + r_{33})E_E}{\frac{1}{n_o^2} + \frac{1}{n_e^2}} \right\} \quad (8)$$

Equations 7 and 8 provide $n_{TE}$ and $n_{TM}$. What is desired, of course, is the expressions for the changes in $n_{TE}$ and $n_{TM}$ because these are proportional to the wavenumber changes or directional coupler waveguide mismatches $\Delta\beta_{TE}$ and $\Delta\beta_{TM}$. These wavenumber changes are proportional to the numerator expressions involving the r coefficients in equations 7 and 8. The values of the r coefficients in LiNbO$_3$ in units of $10^{-12}$ meters/volt are $$\begin{aligned} r_{12} &= -.67, \\ r_{42} &= 28, \\ r_{13} &= 8.6, \\ r_{33} &= 30.8. \end{aligned} \quad (9)$$

Substituting the constants and examining the second term numerators of Equations (7) and (8) yields $$\Delta\beta_{TM} \alpha - 96E_M + 17E_E \quad (10)$$

$$\Delta\beta_{TE} \alpha\ 16E_M - 95E_E \quad (11)$$

Equations 10 and 11 mathematically demonstrate that the effects of the impressed electric field components $E_M$ and $E_E$ upon the wavenumber changes seen by the TM and TE modes are substantially independent as qualitatively described in connection with FIG. 5. The field effects occur primarily by way of the $r_{33}$ and $r_{42}$ coefficients. Analysis of the equations 7 and 8 shows that the effective electrooptic sensitivity to each field component $E_M$ or $E_E$ is about $(96-17)/30.8/2\sqrt{2}$ $r_{33}$ or 0.91 $r_{33}$ which is approximately the same as $r_{33}$, the most sensitive electrooptic coefficient. Thus, this embodiment of the invention advantageously extends the sensitivity of prior art modulators and switches to both of the polarization modes and not just one.

Figure 6:
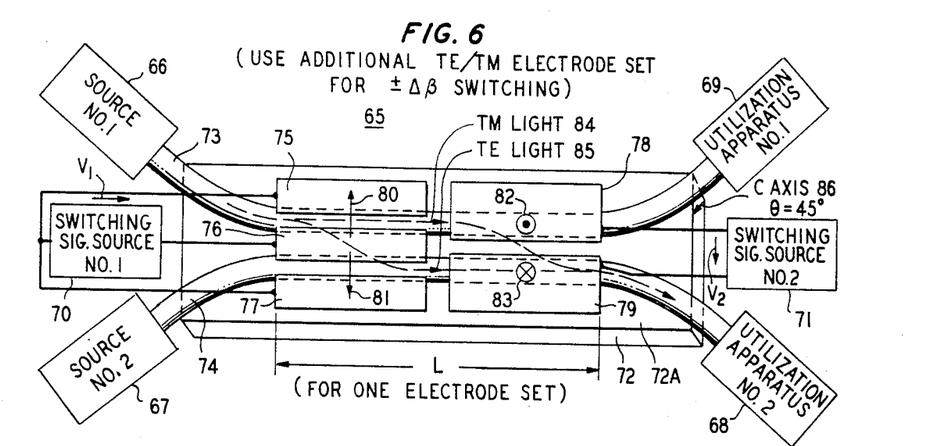
FIG. 6 is a partially pictorial and partially block diagrammatic representation of an embodiment of the present invention, utilizing electrodes provided on only one side of a substrate.

In an alternative embodiment of the dual polarization optical modulator/switch of the invention all of the electrodes can be placed on the same side of the substrate. In FIG. 6, optical switch 65 has a first triplet of electrodes 75, 76 and 77 including middle stripe 76 located between waveguides 73 and 74, and outer stripes 75 and 77 located on either side of the waveguides. Switch 65 also has a pair of electrodes 78 and 79 located on or over optical waveguides 73 and 74 of titanium diffused into LiNbO$_3$ substrate 72. Sources 66 and 67 respectively provide light to be switched and utilization apparatuses 68 and 69 receive the light so switched. C-axis 86 is inclined at an angle $\theta$ of 45 degrees. Waveguides 73 and 74 are constructed suitably somewhat different in cross-section so that they have different $\beta$'s and directional coupling is spoiled when the electrodes are not energized. Electrodes 75, 76 and 77 bear a first tunable control signal on stripes 75 and 77 with respect to stripe 76 by being connected to V$_1$ switching signal source 70 so as to provide electric fields 80 and 81, which are antiparallel to each other, perpendicular to the waveguides and essentially parallel to the substrate major surface to influence the TE modes. Electrode pair 78 and 79 bear the second tunable control signal V$_2$ from source 71 and are located over the waveguides 73 and 74 in such a way as to produce oppositely directed electric fields 82 and 83, which are substantially perpendicular to both of the waveguides and the substrate as shown in FIG. 6 to influence the TM modes.

In an example of the operation of the embodiment of FIG. 6 dual polarized light from source 66 passes along waveguide 73 and enters triplet electrodes 75, 76 and 77. TM light component 84 has its electric field $\epsilon_{TM}$ perpendicular to the impressed electric field components 80 and 81. Accordingly, the TM light 84 is relatively unaffected by any switching voltage V$_1$ applied to the electrode triplet and its energy passes along waveguide 73 unaffected because the waveguide 73 and 74 coupling is spoiled in fabrication. On the other hand, the TE light 85 has its electric field $\epsilon_{TE}$ parallel to the electric field components 80 and 81 which equalize the $\beta$'s in the waveguides electrooptically for the TE mode and permit directional coupler action to occur. Accordingly, the TE light 85 energy passes from waveguide 73 to waveguide 74 by the well-known evanescent wave coupling phenomenon.

The switch 65 completes its action in the directional coupler portion beneath electrodes 78 and 79 by permitting the TM light 84 to cross between the waveguides substantially affected by equalization of $\beta_{TM}$'s by the electric fields 82 and 83, while the TE light 85 is held in waveguide 74 by the spoiling effect of fabrication on the TE modes.

When voltages V$_1$ and V$_2$ from switching signal sources 70 and 71 are simultaneously removed from the electrodes, both the TM and TE components see a directional coupler with spoiling due to fabrication and pass out waveguide 73 unaffected into utilization apparatus 69. Simultaneous application of the switching voltages V$_1$ and V$_2$ again causes light to be switched into waveguide 74 and enter utilization apparatus 68. When source No. 2 is taken into account, the embodiment of FIG. 6 is seen to act as a reversing switch as between the sources and the utilization apparatuses. Alternating the application of the switching signal voltages in time accomplishes separation of the TE and TM modes for multiplexing and for demultiplexing purposes.

Recently, it has been found that the crosstalk performance of optical switches can be considerably improved by using alternate electrode sections of positive and negative wavenumber changes $\Delta\beta$. Such switches are known as $\pm\Delta\beta$ optical switches and are disclosed in U.S. Pat. No. 4,012,113 issued Mar. 15, 1977 to H. W. Kogelnik and R. V. Schmidt, said patent being incorporated herein by reference. Such switches are further improved according to the present invention for dual polarization operation.

In general, $\pm\Delta\beta$ operation involves directional coupler switching over a length L somewhat different from a multiple of the critical coupling length l. The length L is selected from a "cross-bar" diagram like those of FIGS. 3 and 8 of said U.S. Pat. No. 4,012,113, and since the method of doing so is disclosed in said patent no further attention to the subject is believed necessary herein.

The dual polarization switch 20 of FIG. 4 is adapted for $\pm\Delta\beta$ switching by fabricating a directional coupler of a length L selected from a cross-bar diagram and then fabricating a first set of electrodes 21, 22, 23, 24, 25 in the geometry shown in FIG. 4 and also providing a second electrode sequence 21', 22', 23', 24', 25' (not shown) of identical cross-section (using a second top-mounted and bottom mounted pair further into the paper in the drawing) for applying electric field components respectively opposite in direction or antiparallel to components 28, 29 and 30, 31 of FIG. 4. Electrode portions such as 22 and 22' which are grounded or otherwise at the same potential may of course be fabricated as one electrode stripe. A second bridge network with a second set of voltage sources 39' and 40', not shown, for producing opposite polarity voltages in magnitude approximating $V_1$ and $2V_2$ of sources 39 and 40 is suitably provided, for driving the second sequence of electrodes in the cross state. Sources 39, 40, 39' and 40' are made switchable in voltage so as to also achieve a low voltage bar state by a technique related to the teachings of said U.S. Pat. No. 4,012,113, column 7, first full paragraph.

Likewise, the dual polarization switch of FIG. 6 is modified for $\pm\Delta\beta$ switching by redesigning the length L by including electrodes 75–79 in a left half of length L, and in a right half of length L adding another electrode sequence identical to 75, 76, 77, 78, 79 having a second electrode triplet 75', 76', 77' (not shown) and a second electrode pair 78', 79' (not shown) driven by third and fourth switching signal sources (not shown). In this way two additional pairs of electric field components 80', 81' and 82', 83' (not shown) are added so as to be respectively antiparallel to components 80, 81, 82, and 83 and achieve reduced crosstalk optical switching.

Figure 7:
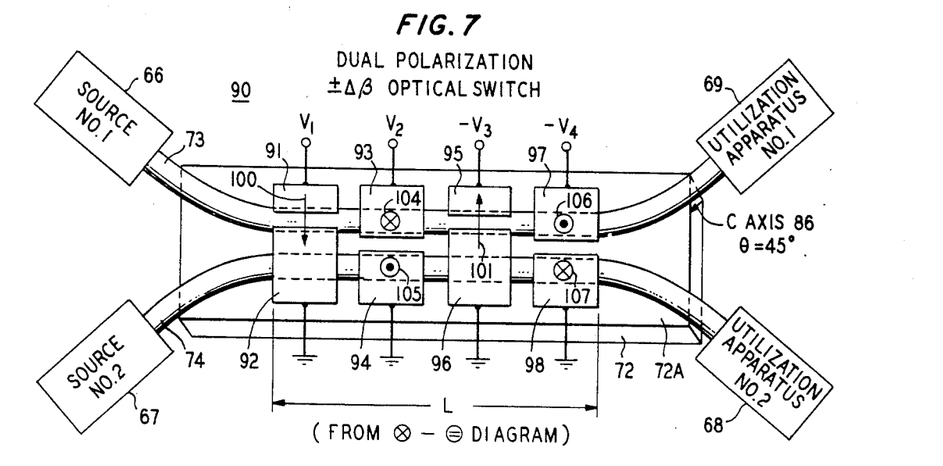
FIG. 7 is a partially pictorial and partially block diagrammatic view of an embodiment of the present invention utilizing electrode pairs in a configuration for dual polarization switching and $\pm\Delta\beta$ optical switching for reduced crosstalk.

In FIG. 7, $\pm\Delta\beta$ optical switch 90 is similar to the switch of FIG. 6 modified as just mentioned and utilizes substrate 72, waveguides 73 and 74, sources 66 and 67 and utilization apparatuses 68 and 69. In switch 90, the length L is selected from a crossbar diagram based on analysis disclosed in said U.S. Pat. No. 4,012,113. Two pairs of $\pm\Delta\beta_{TE}$ electrodes are provided by electrode pair 91, 92 for providing field component 100 and electrode pair 95, 96 for providing antiparallel component 101. These pairs 91, 92 and 95, 96 are located on either side of waveguide 73 for bearing opposite polarity tunable control signals $V_1$ and $-V_3$ where $V_1$ approximates $V_3$. Each of these pairs is replaceable as previously discussed by a triplet like 75, 76, 77 in FIG. 6, but the use of the offset pairs 91, 92 and 95, 96 are shown in FIG. 7 to illustrate a form which can provide an economic advantage in manufacture. Two pairs of $\Delta\beta_{TM}$ electrode sections are shown as electrodes 93, 94 for providing field components 104 and 105 and electrode pair 97, 98 for providing antiparallel components 106, 107 in FIG. 7. These are similar in construction to electrode pair 78, 79 of FIG. 6 in being pairs of electrode stripe portions located over each of the waveguides 73 and 74 respectively so that stripes 93 and 97 lie over waveguide 73 and stripes 94 and 98 are over waveguide 74. As shown in FIG. 7, switching voltages $V_1$ and $-V_3$ are applied to electrodes 91 and 95 for providing the $\pm\Delta\beta$ for the TE polarization mode. Electrodes 92 and 96 are grounded. Likewise, switching voltages $V_2$ and $-V_4$, which are also about equal in magnitude but opposite in polarity, are applied to electrodes 93 and 97 respectively to provide the $\pm\Delta\beta$ for the TM modes. Electrodes 94 and 98 are also grounded. Since all four of the electrodes 92, 94, 96 and 98 are grounded, they are suitably electrically joined and fashioned as a single electrode. In an alternative construction, electrodes 95 and 97 are grounded and electrodes 96 and 98 are made to bear $V_3$ and $V_4$ respectively. Utilizing the principles of dual polarization and $\pm\Delta\beta$ switching, the voltages $V_1$, $V_2$, $-V_3$, and $-V_4$ are adjusted for low crosstalk switching in both the cross state and the bar state.

As an additional note on the approach in the apparatus of FIG. 7, it can be said that if the $\pm\Delta\beta$ feature is to be omitted in a modulator or undemanding switch application, only electrodes 91, 92, 93 and 94 are needed and the length L is redesigned as 2nl following FIG. 6.

Figure 8:
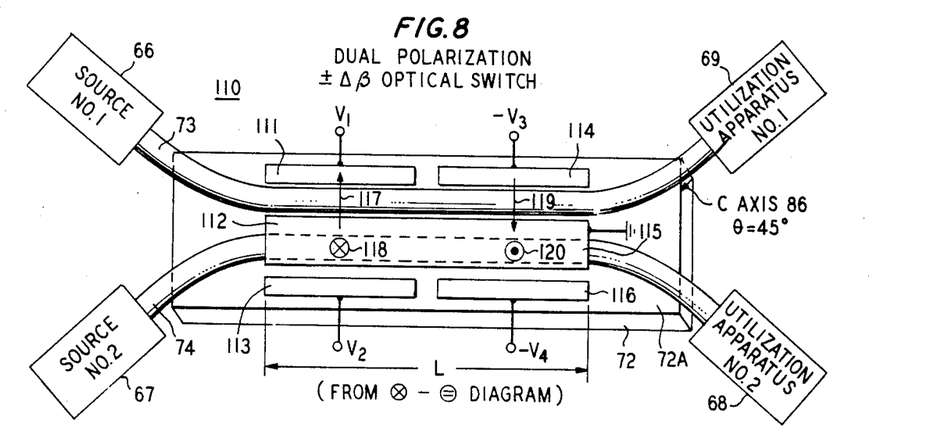
FIG. 8 is a partially pictorial and partially block diagrammatic representation of an embodiment of the present invention using an alternative laterally asymmetric electrode structure for dual polarization and $\pm\Delta\beta$ optical switching.

FIG. 8 shows an additional alternative electrode structure for $\pm\Delta\beta$ switching in optical switch 110. The length of the switch is suitably the same as in FIG. 7 and two asymmetric electrode triplets 111, 112, 113 and 114, 115, 116 are provided as shown. Middle electrode stripe portions 112 and 115 each located over waveguide 74 and extending near to one side of waveguide 73 are both grounded and suitably joined together. Outer electrode stripes 111, 113 and 114, 116 are located on either side of waveguides 73 and 74, respectively in their pairs. Electrodes 111 and 112 are provided with a potential difference $+V_1$ and electrodes 114 and 115 are provided with a potential difference $-V_3$ so as to impress electric fields 117 and 119 across waveguide 73 for $\pm\Delta\beta$ switching of the TE mode. Electrodes 112 and 113 are provided with potential difference $V_2$ and electrodes 115 and 116 are provided with potential difference $-V_4$ so as to provide the impressed electric fields 118 and 120 for $\pm\Delta\beta$ switching of the TM mode. Of course, where the low crosstalk advantage of $\pm\Delta\beta$ switching is not required, a single asymmetric electrode triplet such as 111, 112, 113, having length equal to or an odd multiple of the minimum cross-over length L may be used in a manner similar to the embodiments previously described. In the $\pm\Delta\beta$ version it is a second asymmetric triplet such as 114, 115, 116 which provides the two additional field components 119 and 120 which are antiparallel to components 117, 118, respectively so as to permit the reduced crosstalk optical switching.

In the previously disclosed embodiments of the invention in which $\pm\Delta\beta$ switching is not used, i.e., those embodiments as in FIGS. 4 and 6 utilizing a length L equal to or an odd multiple of the minimum resonant length l, it has been assumed that the length L is fabricated with sufficient accuracy for the degree of modulator/switch performance required in a given application. Where for economic or other reasons, it is desired to relax the accuracy of L required in the physical fabrication process, the invention advantageously permits electrical tuning of the effective L seen by the TE and TM modes respectively.

Figure 9:
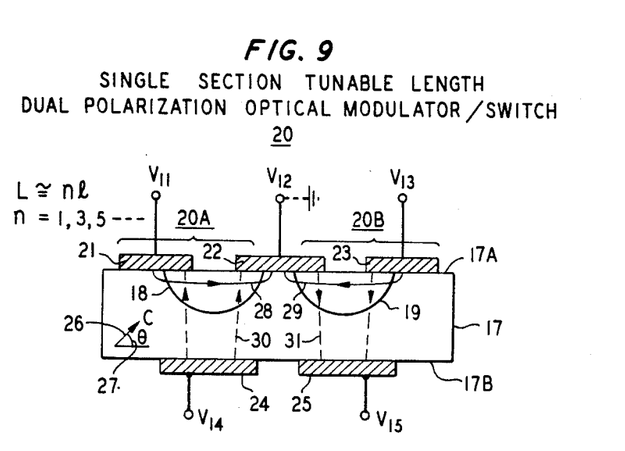
FIG. 9 shows the embodiment of FIG. 4 in which independently adjustable voltages are applied to the electrodes.

FIG. 9 shows a directional coupler article of the invention like that of FIG. 4, like portions being numbered identically to the counterpart portions of the embodiment of FIG. 4. In FIG. 9, however, the length L only approximates the length l or odd multiple thereof as seen by the TE mode and the TM mode. In order to tune the length for both polarization modes and thus obtain more advantageous modulation and reduced crosstalk optical switching other than by the $\pm\Delta\beta$ approach, the coupling between waveguides 18 and 19 is made elctrically modifiable. That is, the coupling for the TE mode is electrically modified by a first additional voltage adjustment and the TM mode is electrically modified by a second additional voltage adjustment. Accordingly, electrodes 21, 22, 23, 24 and 25 are respectively provided with voltages $V_{11}$, $V_{12}$, $V_{13}$, $V_{14}$ and $V_{15}$ which are capable of being adjusted and switched to the two switching states, or otherwise appropriately modulated. Since only 4 degrees of freedom are ideally required to tune the four variables $\Delta\beta_{TE}$, $\Delta\beta_{TM}$, TE coupling change and TM coupling change one of the voltages from among $V_{11}$, $V_{12}$, $V_{13}$, $V_{14}$, and $V_{15}$ is advantageously set to be constant or at ground.

For example, in FIG. 9 $V_{12}$ is suitably set to zero volts by grounding electrode 22. Electrodes 21, 23, 24 and 25 are respectively driven with switchable sources of voltage $V_{11}$, $V_{13}$, $V_{14}$ and $V_{15}$. The voltages $V_{11}$ and $V_{12}$ ($V_{12}=0$ here) determine the electric field component 28 in waveguide 18 and the voltages $V_{12}$ and $V_{13}$ ($V_{12}=0$ here) determine the electric field component 29 in waveguide 19. The change of refractive index in each guide for the TE mode via the electrooptic effect modifies almost independently the propagation constant difference $\Delta\beta_{TE}$ of the waveguides and the change in coupling between them since the difference of the changes in index in the guides 18 and 19 is related to $\Delta\beta_{TE}$ and the average of the changes is related to the coupling change. Thus, independent adjustments of $V_{11}$ and $V_{13}$ suffice to satisfy both the wavenumber change $\Delta\beta_{TE}$ and coupling change requirements for any given switching state.

For the other polarization mode, the TM mode, the wavenumber change $\Delta\beta_{TM}$ and TM coupling change requirements are advantageously satisfied by independent adjustment of voltages $V_{14}$ and $V_{15}$ at electrodes 24 and 25. For example, if voltages $V_{11}$, $V_{12}$ and $V_{13}$ all be set to zero, then the difference of the voltages $V_{14}$ and $V_{15}$ is related to the wavenumber change $\Delta\beta_{TM}$, and the average of the voltages $V_{14}$ and $V_{15}$ is related to the TM coupling change. In general, if the voltages on electrodes 21, 23, 24 and 25 be respectively written as $V_{11}$, $V_{13}$, $$V_{14} = V_{11}/2 + \Delta V_{14}, \text{ and} \qquad (12)$$

$$V_{15} = V_{13}/2 + \Delta V_{15} \qquad (13)$$

with $V_{12}=0$, then the TE wavenumber change $\Delta\beta_{TE}$ is related to $V_{11}+V_{13}$, the TE coupling change is related to $(V_{11}-V_{13})/2$, the TM wavenumber change $\Delta\beta_{TM}$ is related to $\Delta V_{14}-\Delta V_{15}$, and the TM coupling change is related to $(\Delta V_{14}+\Delta V_{15})/2$.

In preparing the invention for use as a switch, the skilled worker suitably provides arbitrarily polarized light from a test source and experimentally determines the $V_{11}$ and $V_{13}$ required for achieving a null in light transmitted in guide 18 with $V_{14}=V_{11}/2$ and $V_{15}=V_{13}/2$. This adjustment provides an approximate cross-state setting for the TE component. Then $V_{14}$ and $V_{15}$ are tuned experimentally for a substantially complete null in the light transmitted in guide 18 so that the cross-state condition is obtained for both the TE and TM modes. The voltage values obtained are the cross-state values. Next, the same experimental adjustment procedure is performed to obtain a substantially complete null in the light transmitted in guide 19 so that the bar-state condition is obtained for both the TE and TM modes. The voltage values thus obtained are the bar-state values. To use the invention as a switch, standard switches, voltage sources and voltage dividers are suitably provided in an electrical circuit so as to alternatively apply the cross-state values and then the bar-state values.

The triplet-pair embodiment of FIG. 6 is analogously suitably modified for tuning of the coupling length L by grounding electrode 76 and feeding electrodes 75 and 77 with independently adjustable voltage sources $V_{1A}$ and $V_{1B}$ (not shown), and providing a grounded electrode plate beneath substrate 72 under electrodes 78 and 79 and feeding electrodes 78 and 79 with independently adjustable voltage sources $V_{2A}$ and $V_{2B}$ (not shown) to obtain the 4 degrees of freedom desired.

It should be clear that the invention broadly involves dual polarization switching in electromagnetic waveguides, that physical effects other than the electrooptic effect are employed in embodiments of the invention, and that a variety of materials other than $LiNbO_3$ and $LiTaO_3$ are contemplated for use in the invention where appropriate. Gapless dual polarization directional couplers and single-waveguide wave-processing apparatus of a variety of types are within the scope of the invention. Accordingly, the hereinabove disclosed preferred embodiments are to be considered as merely illustrative examples for practicing the invention since the invention in its full scope comprehends many materials, effects and embodiments so that the utility of the invention may be fully realized.

What is claimed is:

1. An optical modulator/switch comprising:
a pair of waveguides, made of an electrooptic material, extending coextensively over a coupling interval L;
said waveguides being formed along one major surface of a substrate of lower refractive index and being capable of supporting propagating modes of optical wave energy in two, mutually orthogonal directions of polarization;
and means for producing electric field components within said waveguides having components parallel to said directions of polarization;
CHARACTERIZED IN THAT
said mutually orthogonal electric field components extend over coextensive portions of said coupling interval, and are separately controllable.

2. The modulator/switch according to claim 1 wherein said means comprises:
a first set and a second set of three electrodes longitudinally disposed along said one surface of said substrate within said coupling interval for producing electric field components within said waveguides in a direction perpendicular to the axes of said waveguides and parallel to the plane defined by the waveguide axes;
and a first set and a second set of two electrodes longitudinally disposed along an opposite major surface of said substrate for producing, in cooperation with said first and second sets of three electrodes, respectively, electric field components in each of said waveguides in a direction perpendicular to both said waveguide axes and said plane.

3. The modulator/switch according to claim 2 wherein the electric field components produced by said first sets of electrodes in said waveguides are antiparallel to the electric field components produced by said second sets of electrodes in said respective waveguides;

and in that the electric field components produced in each waveguide by both said first and second sets of electrodes are antiparallel to the electric fields produced in the other of said waveguides.

4. The modulator/switch according to claim 3 wherein each set of three electrodes includes an inner electrode disposed between said waveguides, and two outer electrodes, each of which is disposed, respectively, adjacent to the outer side of one of said waveguides;

and wherein each electrode of each set of two electrodes is disposed directly opposite one of said waveguides.

5. The modulator/switch according to claim 1 wherein said means for producing said electric field components include independently adjustable voltage sources.

6. The modulator/switch according to claim 1 wherein said means comprises:

a first set and a second set of three electrodes longitudinally disposed along said one surface of said substrate within said coupling interval for producing an electric field in one waveguide in a direction parallel to only one of the directions of wave polarization, and for producing in the other of said waveguides an electric field in a direction parallel to only the other direction of wave polarization.

7. The modulator/switch according to claim 6 where each set of electrodes comprises:

an inner electrode that extends over one of said two waveguides and at least the region therebetween;

and two outer electrodes, each of which is disposed, respectively, adjacent to the outer side of one of said waveguides.

8. The modulator/switch according to claim 7 wherein the dimension of the two outer electrodes of each set of electrodes in the direction parallel to said waveguides is equal to or less than one-half the coupling interval.

9. The modulator/switch according to claim 7 wherein the electric fields produced by said first set of electrodes in said waveguides are antiparallel to the electric fields produced by the second set of electrodes in said respective waveguides.

10. The modulator/switch according to claim 1 wherein said electrooptic material has a c-axis orientation that is perpendicular to the longitudinal axes of said waveguides over said coupling interval and is at an angle of between 15 and 75 degrees with respect to the plane defined by said axes.

11. The modulator/switch according to claim 10 wherein the c-axis makes a 45 degree angle with the plane defined by the waveguide axes.

* * * * *